United States Patent [19]
Niskanen

[11] Patent Number: 5,103,542
[45] Date of Patent: Apr. 14, 1992

[54] FLUID DISTRIBUTION SYSTEM FOR A VARIABLE-CROWN ROLL

[75] Inventor: Juhani Niskanen, Muurame, Finland

[73] Assignee: Valmet Paper Machinery Inc., Finland

[21] Appl. No.: 561,851

[22] Filed: Aug. 1, 1990

Related U.S. Application Data

[63] Continuation of Ser. No. 350,083, May 10, 1989.

[30] Foreign Application Priority Data

May 11, 1988 [FI] Finland .................. 882214

[51] Int. Cl.⁵ .................................. B21B 13/02
[52] U.S. Cl. ........................ 29/116.2; 29/116.1; 29/129
[58] Field of Search .......... 29/113.1, 113.2, 116.2, 29/129

[56] References Cited

U.S. PATENT DOCUMENTS

| | | | |
|---|---|---|---|
| 3,430,321 | 3/1969 | Lyons | 29/129 |
| 3,494,675 | 2/1970 | Hold et al. | 29/116.2 X |
| 4,090,282 | 5/1978 | Lehmann | 29/116.2 |
| 4,358,993 | 11/1982 | Spillmann | 29/113.2 X |
| 4,683,628 | 8/1987 | Schönemann | 29/116.2 |
| 4,757,582 | 7/1988 | Verkasalo | 29/116.2 |
| 4,757,584 | 7/1988 | Pav et al. | 29/116.2 X |
| 4,796,525 | 1/1989 | Schiel et al. | 29/116.2 X |
| 4,848,119 | 7/1989 | Pav et al. | 29/116.2 |

FOREIGN PATENT DOCUMENTS 6015324 2/1981 Japan .................. 29/116.2

Primary Examiner—Timothy V. Eley
Assistant Examiner—C. Richard Martin
Attorney, Agent, or Firm—Steinberg & Raskin

[57] ABSTRACT

The invention concerns a fluid distribution system for a variable-crown roll adjustable in zones, this roll having a stationary central axle and a revolving roll mantle arranged on the axle. Hydraulic loading elements acting upon an inner face of the roll mantle or a corresponding pressure-fluid chamber, or a series of chambers, may be provided in a space between the central axle and the mantle, so that the axial profile of the variable-crown roll can be adjusted. The fluid distribution system of the roll has a system of fluid distribution ducts provided in connection with the central axle, with pressure fluid passing to zones of the roll being arranged to be supplied through this system. The system of fluid distribution ducts has an oblong, continuous profile of substantially circular section, which is provided with several axial ducts and with transverse bores for passing the fluid at least to the hydraulic loading elements. An axial hole has been formed into the central axle of the roll, and into which the profile is fitted. The profile is sealed on an outer face thereof with respect to this hole in the axle, by seals between the discrete zones.

9 Claims, 2 Drawing Sheets

FLUID DISTRIBUTION SYSTEM FOR A VARIABLE-CROWN ROLL

This is a continuation of application Ser. No. 350,083, filed 5-10-89.

BACKGROUND OF THE INVENTION

The present invention concerns a fluid distribution system for a variable-crown roll adjustable in zones, this roll comprising a stationary central axle and a revolving roll mantle arranged on the axle, hydraulic loading elements acting upon an inner face of the roll mantle, or a corresponding pressure-fluid chamber, or a series of chambers being provided in a space between the central axle and the mantle. The axial profile of the variable-crown roll can be adjusted by means of these elements or chambers. Furthermore, the fluid distribution system in this roll comprises a system of fluid distribution ducts provided in connection with the central axle. The distribution system is arranged to supply through the same at least pressure fluid passing to the zones of the roll.

Several different adjustable-crown rolls for paper machines or paper finishing equipment are known in the prior art, for which different designations are used such as variable-crown rolls, rolls adjustable in zones, and equivalent terminology. As a rule, these rolls comprise a massive or tubular, stationary roll axle and a roll mantle arranged to revolve about the axle. Between the axle and the mantle, arrangements of glide shoes and/or a chamber of pressure fluid or a series of chambers acting upon an inner face of the mantle, are positioned so that the axial profile of the mantle at the nip can be aligned or adjusted as desired.

In variable-crown rolls, a complicated fluid distribution system is required because the roll includes several points to which fluid must be passed. Such points include zones in a variable-crown roll to which pressure fluid must be passed, various points that require lubrication to which lubrication oil is passed, possible means for the heating of the roll for the supply of heating fluid, and corresponding points that consume fluid. Since a roll includes a great number of different fluid-consuming points, the roll must naturally also have a system of ducts for the outlet fluid. In the prior art, the system of fluid distribution ducts had been formed in a variable-crown roll in a number of alternative ways.

One prior art solution is described, e.g., in U.S. Pat. No. 4,222,324, in which an axial bore of its own has been formed into the axle of the variable-crown roll for each zone of the variable-crown roll, the fluid being passed into the zones out of the bore through radial bores. Thus, it has been necessary to make a considerably high number of bores and provide various pipe systems in such a roll. This results in the drawbacks that cost of manufacture of the system of fluid distribution ducts is quite high, and the system of ducts requires very careful workmanship, since various rubbish, dirt, machine cuttings, and equivalent tend to remain in the ducts. Moreover, it has been necessary to form bores of their own into the roll axle for possible heating and lubrication of the roll, or the roll has had to be provided with a separate system of ducts for these functionings.

Another prior art solution is described, e.g., in DE Patent No. 28 47 029, in which construction an axial bore of large diameter has been formed into the roll axle, with a series of pipes being fitted into this bore and comprising a number of pipes through which the pressure fluid is passed to the hydrostatic loading elements placed in the zones of the roll. The pipe series is connected with a number of sealing elements, by means of which the series of pipes is sealed relative to the axial bore in the axle between the zones. One of the considerable drawbacks of this arrangement is that the pipe series comprises a number of sealing points, and consequently comprises a number of seals. Moreover, the pipes included in the series of pipes must be of very high quality in order to endure the pressures required by the zones. Additionally, these drawbacks have the consequence that the construction of the DE patent structure is extremely expensive and difficult to manufacture. Also, such a solution requires separate systems of ducts, e.g., for possible heating of the roll and for the objects that require lubrication therein.

A further prior-art solution is described, e.g., in U.S. Pat. No. 4,106,405. In the solution described in this document, a central hole of large diameter has been formed into the roll axle, with coaxially-arranged pipes being fitted in this hole through which pressure fluid is fed into the zones of the roll. This solution also involves a number of various drawbacks of which it might be noted that, e.g., the wall thickness of the pipes have to be large because the pressures required by adjoining zones may quite essentially differ from one another. Thus, the risk of buckling of the pipes is quite high. The sealing of the pipes in this solution is also quite doubtful, since the pipes must be sealed relative to one another on the one hand, and must be sealed relative to the central hole formed into the roll axle on the other hand. Thus, such a fluid distribution system is difficult and expensive in view of the manufacture. In this system as well, the roll must be provided with a separate fluid distribution system for possible heating of the roll.

SUMMARY OF THE INVENTION

Accordingly, it is an object of the present invention to provide a fluid distribution system for a variable-crown roll, by means of which the above drawbacks involved in the prior art are avoided, and by means of which essential improvement is achieved over the prior art.

These and other objects are attained by the present invention which is directed to a fluid distribution system for a variable-crown roll, comprising an oblong, continuous profile of substantially circular cross-section provided with several axially-extending ducts and transverse bores communicating with the ducts, the profile being formed and arranged to fit within an axially-extending hole formed within a stationary central axle of the roll, and means for sealing an outer face of the profile. The roll may additionally comprise a revolving mantle arranged upon the axle, and means for loading an inner face of the mantle and axially adjusting the loading or loading profile of the roll. In particular, the loading means comprise at least one hydraulic loading element or corresponding pressure fluid chamber provided in a space between the inner face of the mantle and the central axle, and arranged to act upon the inner mantle face, thereby loading the same, with the fluid distribution system arranged to pass fluid to the at least one loading element or corresponding chamber.

The loading means preferably comprise a series of loading elements or chambers arranged to load the inner mantle surface in discrete, separate zones, with the fluid distribution system arranged to individually supply fluid to the discrete, separate zones through the ducts and bores, and with the sealing means comprising seals arranged to seal the outer face of the profile between the respective zones.

In view of achieving the above-noted object and those which will become apparent below the present invention is principally characterized by the system of fluid distribution ducts comprising an oblong continuous profile of substantially circular section, which is provided with several axial ducts and transverse bores for passing the fluid at least to hydraulic loading elements, with an axial hole having been formed into a central axle of the roll and into which the profile is fitted, with the profile being sealed with respect to this hole at an outer face thereof by means of seals between various zones.

Of the advantages provided by the present invention over the prior-art solutions, the following, e.g., should be noted. In the present invention, the system of fluid distribution ducts is formed in a single profile which is fitted into a hole axially formed into the roll axle. If necessary, the profile may include the ducts for the pressure fluid passing to the zones, the ducts for lubricant, the duct for exhaust oil, and, if necessary, a system of ducts for heating fluid. Thus, if necessary, [by means of the profile in accordance with the present invention] all the requirements imposed by the entire circulation of fluid in the roll can be handled by means of the fluid distribution ducts system profile in accordance with the invention. The solution of the present invention is also preferable to solutions currently in use, with respect to the sealing, since the present invention does not require a number of pipes to be sealed, but only that the systems profile has to be sealed in the hole formed into the roll axle.

The material of the profile may be, e.g., aluminum or a suitable aluminum alloy, in which case the profile can be manufactured by means of extrusion and thereafter cut to the specified dimension. The installation of such a profile into the roll is also simple and easy, because the profile is of relatively low weight and because there are very few points to be sealed between the profile and the roll axle.

BRIEF DESCRIPTION OF THE DRAWINGS

Other advantages and characteristic features of the present invention will become apparent from the following detailed description below, to which, however, the present invention is not intended to be exclusively confined. In the drawings.

DESCRIPTION OF THE PREFERRED EMBODIMENTS

Figure 1:
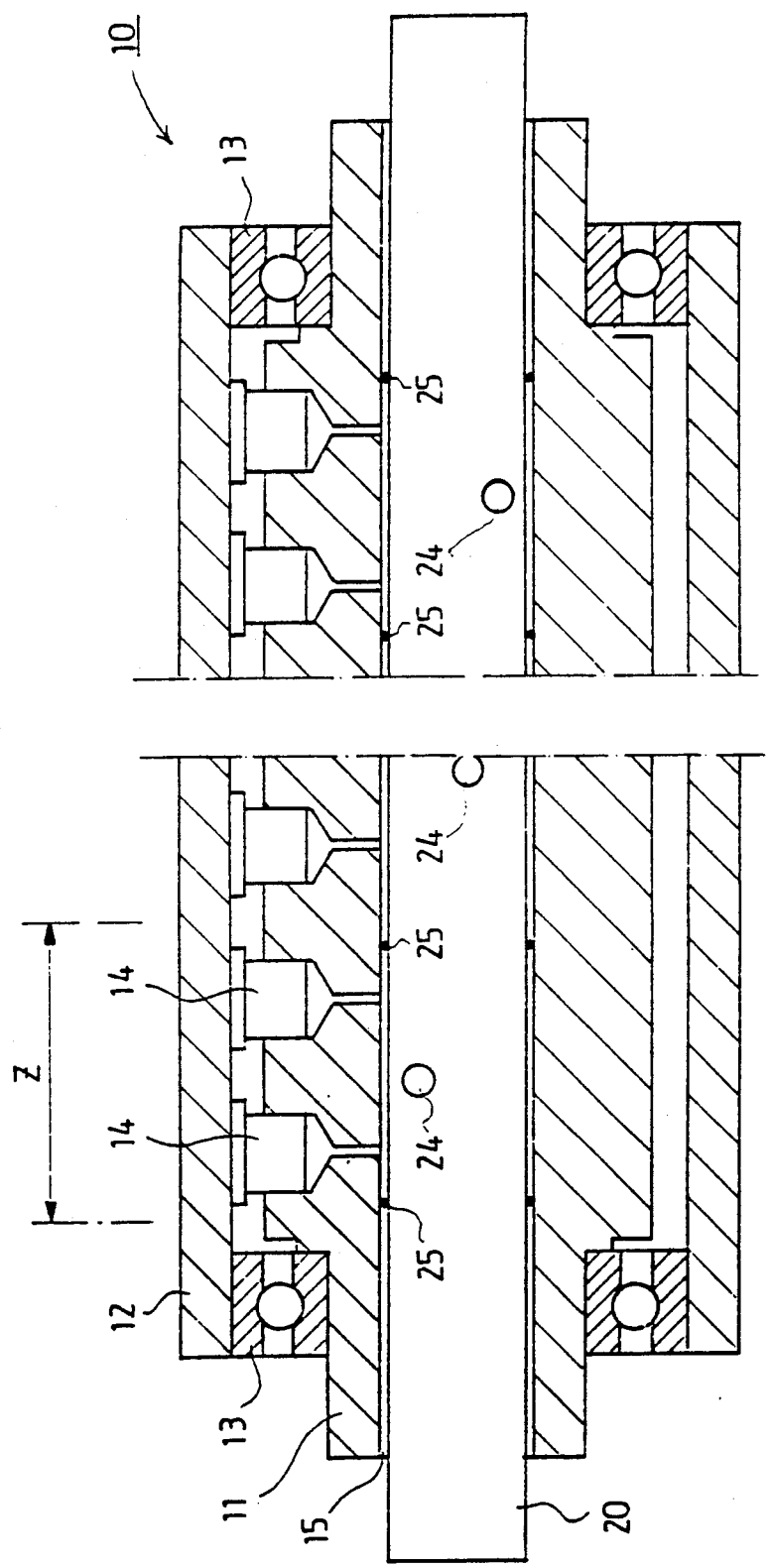
FIG. 1 is a schematic longitudinal sectional view of a variable-crown roll which is provided with a fluid distribution system in accordance with the present invention.

In FIG. 1, the variable-crown roll is generally denoted by reference numeral 10. The roll 10 comprises a roll axle 11 and a roll mantle 12 arranged to revolve on the axle 11. Between the roll axle 11 and the roll mantle 12, loading elements 14 acting upon an inner face of the roll mantle 12 are fitted, by means of which the roll mantle 12 is loaded in the nip plane so as to adjust the axial profile of the roll mantle in the desired manner. The roll 10 shown in FIG. 1 is a so-called variable-crown roll adjustable in zones, in which the loading elements 14 of the roll 10 are divided into zones in an axial direction of the roll, one of these zones being denoted by reference character Z in FIG. 1.

In the roll illustrated in FIG. 1, the roll mantle 12 is additionally supported on the roll axle 11 by means of end bearings 13. The roll 10 may, however, also be a so-called self-loading roll, in which the roll mantle 12 can move in the direction of compression relative to the roll axle 11. A through-hole 15 has been axially formed into the roll axle 11 and into which a profile 20 in accordance with the present invention is fitted, constituting the system of fluid distribution ducts. The profile 20 is sealed in a suitable manner in the hole 15 formed into the roll axle 11 between the zones Z. This is arranged, e.g., so that on the profile 20, seals 25 have been situated in suitable locations, and thereupon the profile 20 has been pushed into the hole 15 formed into the roll axle 11. It is shown in FIG. 1 that the axial hole 15 extends through the axle 11, but if the supply of the fluid into the roll 10 and the removal of the fluid out of the roll 10 are arranged to take place through the same end of the roll 10, then the hole 15 does not have to extend completely through the axle 11.

Figure 2:
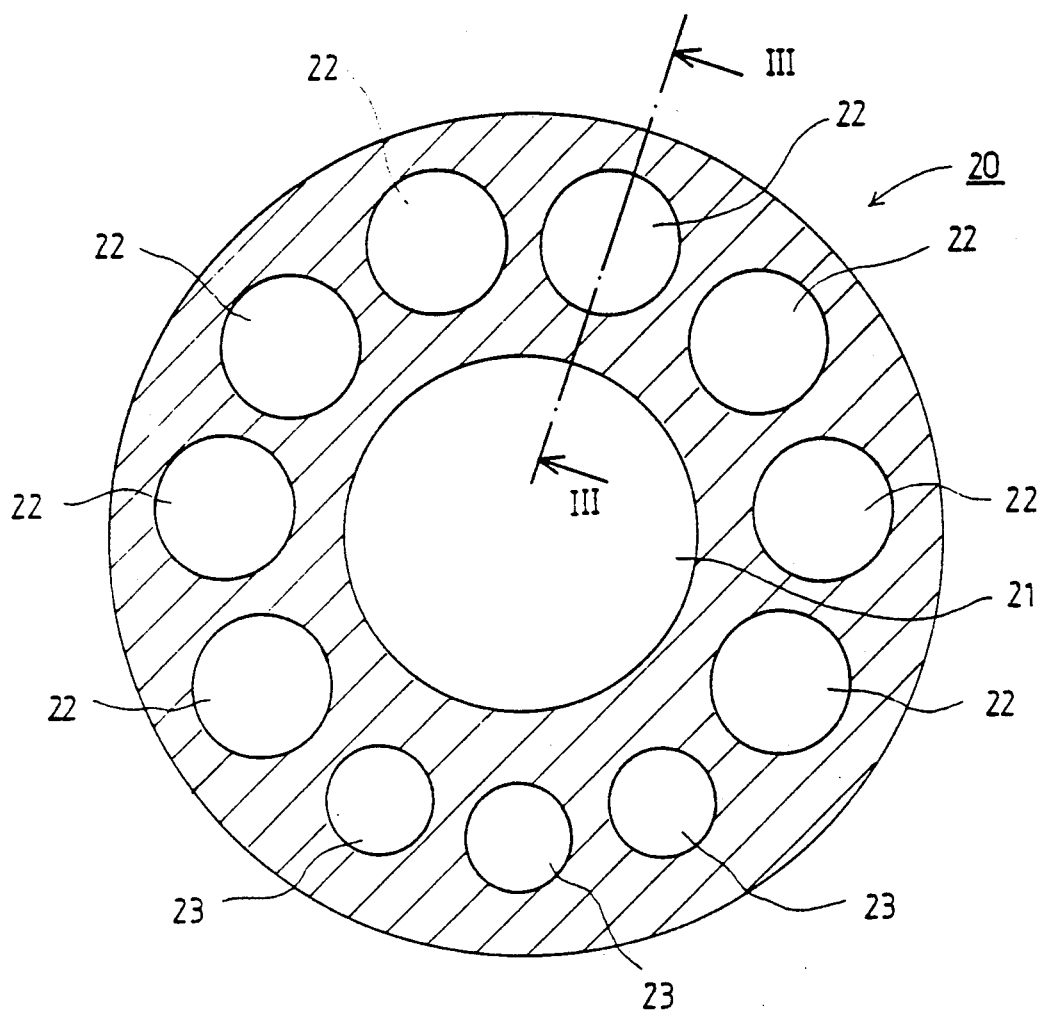
FIG. 2 is a schematic, cross-sectional view of the profile that constitutes the system of fluid distribution ducts.

FIG. 2 is a cross-sectional view of an advantageous embodiment of the profile 2 in accordance with the present invention. A system of ducts 21 . . . 23 has been formed into the profile 20 of circular cross section, which, in the embodiment shown in FIG. 2, comprises a central duct 21 of large diameter formed into the middle of the profile 20, as well as first side ducts 22 and second side ducts 23 of smaller diameter, which are arranged around the central duct 21 in circumferential form. The ducts 21 . . . 23 extend across the entire length of the profile 20.

The material of the profile 20 may be, e.g., aluminum, aluminum alloy, the equivalent, in which case the profile 20 is advantageously manufactured by extrusion. In the profile 20 illustrated in FIG. 2, the first side ducts 22 may be designed, e.g., for the pressure fluid passing to the zones Z of the variable-crown roll 10, and the second side ducts 23, e.g. for the lubricant. The removal of the fluid from the interior of the roll 10 may be arranged through the central duct 21.

Figure 3:
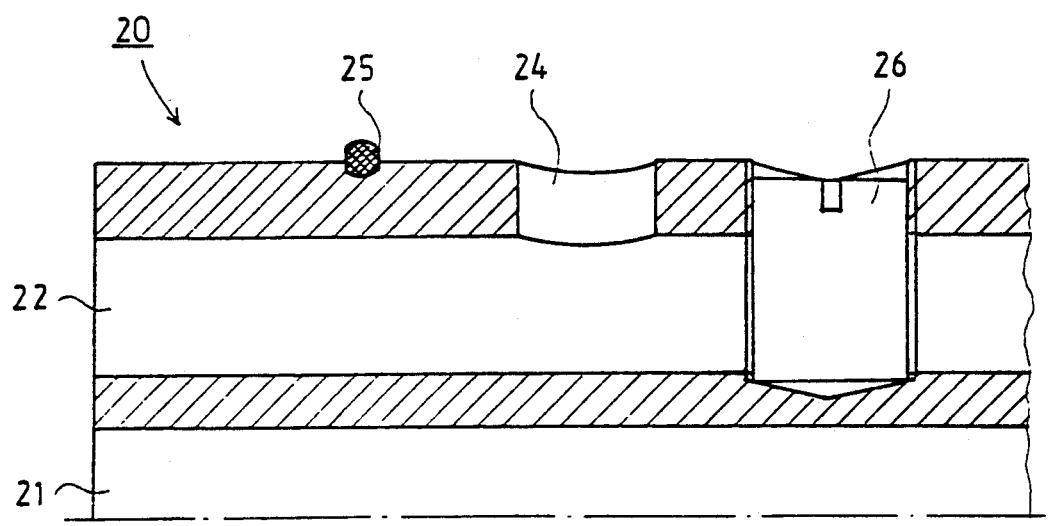
FIG. 3 is a schematic sectional view along line III—III in FIG. 2.

In FIG. 3, it is shown by way of example how the supply of the pressure fluid to the zone Z in the variable-crown roll 10 is arranged through one first side duct 22. For the supply of the pressure fluid from the side duct 22 to the zone Z, a transverse bore 24 has been formed into the profile 20 facing the zone Z, this bore 24 extending from a outer face of the profile 20 to the first side duct 22. After the transverse bore 24, the first side duct 22 is closed by a closing plug 26, so that through the duct 22, the pressure fluid only has access to the desired adjusting zone Z. In the embodiment of FIG. 3, the closing of the duct 22 is arranged so that a threaded hole larger than the diameter of the duct 22 has been formed into the profile 20, and into which a closing plug 26 provided with an outer threading is turned so that the plug 26 blocks the duct 22. Naturally, the closing of the duct 22 may also be arranged in some other suitable manner.

Also, an embodiment is illustrated in FIG. 3 on how the profile 20 can be sealed in the hole 15 formed into the roll axle 11. In the embodiment of FIG. 3, a groove or equivalent has been formed into an outer face of the profile, with a seal 25 passing around the profile 20 being fitted into this groove. Seals 25 of this type are fitted on the profile 20 between each of the zones Z in the roll 10. By means of such a solution, the profile 20 with its ducts 21 ... 23, bores 24, closing plugs 26 and seals 25, can be formed into a completely finished unit, which is inserted into the hole 15. The construction of the seal 25 and its attachment to the profile 20 may naturally also be arranged in some other manner, which differs from the embodiment illustrated in FIG. 3.

The profile 20 in accordance with the present invention may also be used in rolls that require heating, such as, e.g., upper rolls of super-calenders. In such solutions, the heating fluid may be passed into the roll, e.g., through the central duct 21 of the profile 20, from which removal of the fluid out of the roll is additionally arranged through the opposite end of the roll. In such a solution, only the central duct 21 has to be closed between the inlet and the outlet of the fluid, e.g., by means of a closing plug or equivalent. The heating fluid can be passed from the central duct 21 onto the inner face of the roll mantle 12, e.g., through suitable transverse bores. In a corresponding manner, the outlet fluid can be passed into the central duct 21 through transverse bores. In other words, the profile 20 may additionally include ducts for lubrication fluid, for possible roll-heating fluid, as well as for exhaust fluid. Transverse bores may be formed into the ducts 23 and the profile 20 that are intended for lubrication fluid at points requiring lubrication.

Even though it is possible, if necessary, to handle all other requirements of fluid circulation in a variable-crown roll 10 by means of the profile 20 in accordance with the present invention comprising the system of fluid distribution ducts, or at least the major part of these requirements, the solution in accordance with the present invention does not exclude the alternative that other bores may also be formed into the roll axle 11 for fluid circulation.

The present invention has been described by way of example above with reference to the figures in the accompanying drawings. This is, however, not intended to confine the invention to the exemplary embodiments illustrated in the figures alone. Rather, many variations are possible in accordance with the inventive concepts set forth above. Therefore, the preceding description of the present invention is merely exemplary, and is not intended to limit the scope thereof in any way.

What is claimed is:

1. Fluid distribution system for a variable-crown roll, comprising
    a variable-crown roll having a plurality of locations corresponding to discrete zones to which fluid is to be passed, said roll having a stationary central axle having a length, said stationary central axle having a first end and an opposite end, an axially extending hole extending through said stationary central axle from said first end to said opposite end,
    an oblong, continuous profile which is an extruded element of substantially circular cross-section, provided with a plurality of axially-extending ducts and a plurality of transverse bores communicating with said ducts for distributing fluid to said plurality of locations on said roll,
    said profile having a length which is longer than said length of said stationary axle, said profile being fitted within said axially-extending hole and extending from both ends of said stationary central axle, and
    said profile having an outer face, said outer face of said profile being sealed in said axially-extending hole by sealing means at said outer face of said profile between discrete zones,
    each of said plurality of axially-extending ducts being arranged to pass pressure fluid to a respective zone of said discrete zones,
    each said transverse bore communicating a respective one of said axially-extending ducts with said respective zones, and
    a plurality of plugs closing each of said axially-extending ducts after a respective transverse bore, in a direction of fluid feed in order that fluid flows from said axially-extending duct out through a desired transverse bore.

2. The fluid distribution system of claim 1, wherein said roll additionally comprises a revolving mantle arranged upon said stationary central axle, and means for loading an inner face of the mantle and axially-adjusting loading of said roll.

3. The fluid distribution system of claim 2, wherein said loading means comprise at least one hydraulic loading element or corresponding pressure fluid chamber provided in a space between the inner face of the mantle and the central axle, and arranged to act upon the inner mantle face thereby loading the same, and
    said fluid distribution system arranged to pass fluid to the at least one loading element or corresponding chamber.

4. The fluid distribution system of claim 3, wherein the loading means comprise a series of loading elements or chambers arranged to load the inner mantle face in discrete, separate zones,
    with said fluid distribution system arranged to individually supply fluid to said discrete, separate zones through said ducts and bores, and
    said sealing means comprising seals arranged to seal the outer face of said profile between said respective zones.

5. The fluid distribution system of claim 1, wherein at least one of said plurality of axially-extending ducts distributes lubrication fluid.

6. The fluid distribution system of claim 5, additionally comprising
    a plurality of transverse bores being formed into said axially-extending ducts for lubrication fluid at the points requiring lubrication.

7. The fluid distribution system of claim 1, wherein at least one of said plurality of axially-extending ducts distributes roll heating fluid.

8. The fluid distribution system of claim 1, wherein at least one of said plurality of axially-extending ducts distributes exhaust fluid.

9. The fluid distribution system of claim 1, wherein said axially-extending ducts comprise
    a central duct formed substantially at a center of said profile, and
    side ducts circumferentially formed around said central duct.

* * * * *

UNITED STATES PATENT AND TRADEMARK OFFICE
CERTIFICATE OF CORRECTION

PATENT NO. : 5,103,542
DATED : April 14, 1992
INVENTOR(S) : Juhani Niskanen

It is certified that error appears in the above—identified patent and that said Letters Patent is hereby corrected as shown below:

On the title page, item [21] "561,851" should read --561,051--.

Signed and Sealed this

Twenty-fourth Day of August, 1993

Attest:

BRUCE LEHMAN

Attesting Officer          Commissioner of Patents and Trademarks